July 5, 1949.　　　　C. VANERKA　　　　2,475,166
TIME CONTROLLED HEATING SYSTEM FOR MOTOR VEHICLES
Filed July 12, 1947
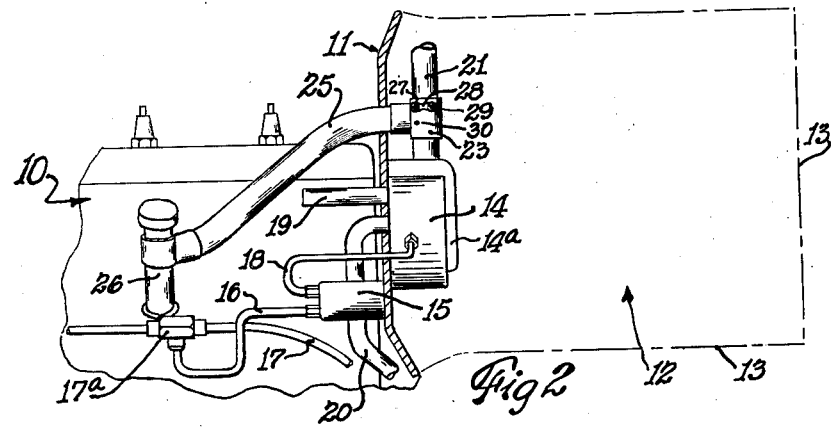
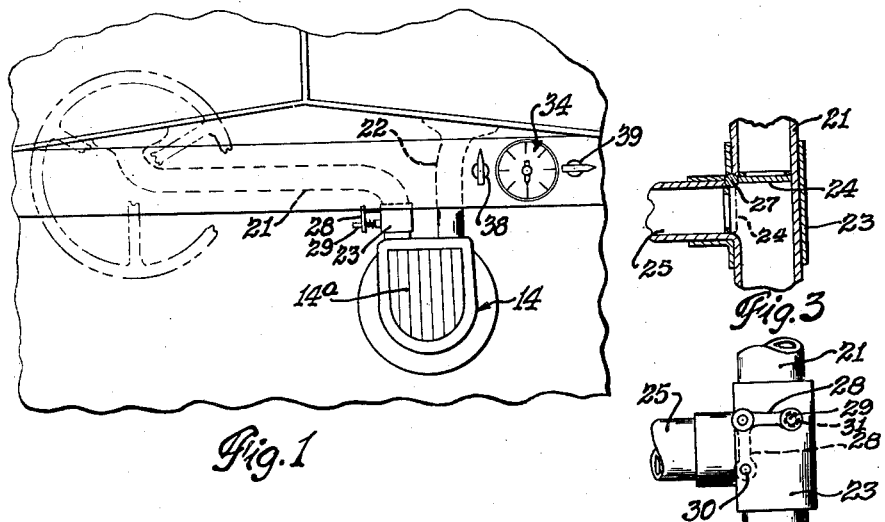
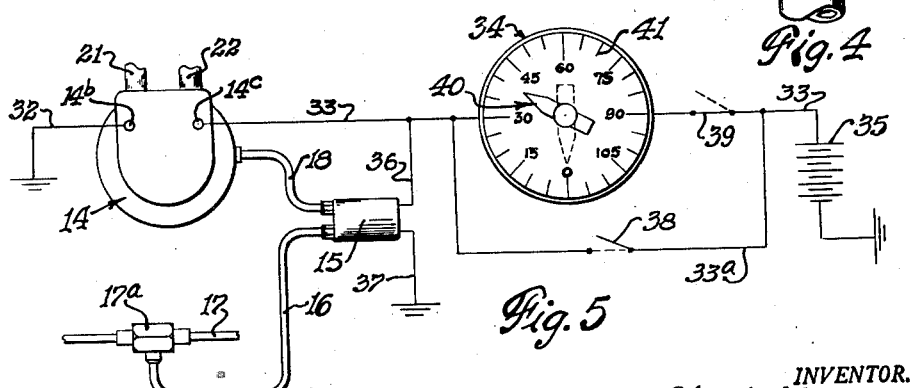
INVENTOR.
Charles Vanerka
BY Frank Schraeder Jr
Attorney Patented July 5, 1949

2,475,166

UNITED STATES PATENT OFFICE 2,475,166

TIME CONTROLLED HEATING SYSTEM FOR MOTOR VEHICLES

Charles Vanerka, Cicero, Ill.

Application July 12, 1947, Serial No. 760,558

6 Claims. (Cl. 123—142.5)

This invention relates to improvements in systems and apparatus for heating motor vehicles such as an automobile or motor-driven truck as well as other motor-driven land vehicles and watercraft and small aircraft which are engine-driven and have an enclosed cab or cabin for the operator and passengers.

For illustrative purposes, my invention shall hereinafter be described in its application to an internal combustion engine driven automobile having an enclosed body for the driver and passengers.

One of the objects of my invention is to provide a time-controlled heating system for an automobile and the like which is adapted to be automatically set into operation to preheat the interior of the automobile body and the engine, without operation of the engine, at and for a predetermined period of time before the automobile is placed into operative use by the operator thus providing easy starting of the engine and comfort for the operator on cold days.

Another object of my invention is to provide a novel time-controlled heating system for an automobile and the like which comprises a self-starting gasoline-powered heater provided with electrical fuel ignition means for the gasoline combustion chamber therein and including an electrically driven solenoid type of fuel pump for feeding the gasoline into the combustion chamber; the fuel ignition means and the fuel pump being electrically connected in a circuit which is energized by the automobile storage battery and controlled by a suitable clock-controlled time switch whereby the heater may be automatically set into operation at predetermined periods of time and for predetermined intervals of time; such operation of the heater fuel supply pump and its fuel ignition being powered solely by the automobile storage battery without operating the engine and being operative automatically for a predetermined limited duration of time sufficient to warm up the engine and the interior of the body before the automobile is placed into operative use.

A novel feature of my invention is found in providing the time-control circuit with a switch between the clock-actuated time-control switch and the storage battery and an additional by-pass switch within a circuit by-passing the clock-actuated time-control switch whereby the heater is adapted to be alternately operated from the storage battery through the time-control switch or directly from the storage battery during the operation of the automobile engine.

The various features of novelty characterizing my invention will hereinafter be pointed out with particularity in the appended claims; but, for a full understanding of my invention and of its various objects and advantages, reference may be had to the following detailed description taken in connection with the accompanying drawing, wherein:

Fig. 1 is a front view of a portion of an automobile dashboard provided with a time-controlled heating system embodying my invention;

Fig. 2 is a vertical section through the lower portion of the dashwall showing the heater, fuel pump, air intake conduit, combustion gas exhaust conduit and the hot air by-pass conduit leading to the breather pipe for the engine crankcase; the engine being shown in part for illustrative purposes;

Fig. 3 is a vertical section through the hot air by-pass valve preferably located in one of the windshield defroster conduits;

Fig. 4 is an enlarged exterior view of the T connection for the crankcase hot air by-pass conduit showing the handle for operating the by-pass valve therein; and Fig. 5 is an electric circuit diagram showing the heater, fuel pump, time-control switch and auxiliary manual control switches.

In the diagrammatic illustrations, the internal combustion engine is designated by numeral 10 and a portion of dashwall by numeral 11. The space 12 within the dot and dash line 13 may be considered as a portion of the interior of the automobile body.

The self-starting gasoline-powered heater 14 is shown mounted on the interior side of the dashwall 11. A fuel pump 15 is shown mounted on outer side of the dashwall 11. The fuel pump 15 is suitably electrically driven by a solenoid type of motor mounted within the pump casing.

The pump 15 is connected at its inlet side by conduit 16 with a T filter 17ª in the gasoline supply pipe 17 and, its outlet side, is connected with the heater 14 by a conduit 18.

The heater 14, which is of a well known type, is provided with the usual air-intake conduit 19 for supplying air to its combustion chamber and the combustion gases are exhausted from the heater through the usual exhaust conduit 20.

The conventional heater discharges heated air through the heater grill 14ª into the interior 12 of the automobile body and through the defroster conduits 21 and 22 to the windshield. To provide heated air for warming up the engine, more particularly its crankcase and the cylinders therein, one of the defroster conduits, as for example, the conduit 21, may be provided with a T connection 23 having a valve 24 therein, whereby heated air may be by-passed from the conduit 21 through the by-pass conduit 25 into the engine crankcase, as for example, through the breather pipe 26.

The valve 24 is pivotally mounted in any suitable manner as, for example, on a pin 27 which extends outwardly of the connection 23 and terminates in a suitable handle 28 which is provided with a spring-pressed pin 29 adapted to enter either of the cavities 30 or 31 to retain the valve 24 in either closed or open position. When the pin 29 is in the cavity 30 the valve 24 is in closed position and permits the heated air to pass from the heater 14 through the defroster conduit 21 to the windshield and when the handle 28 is raised so that the spring-pressed pin 29 is seated in cavity 31 the valve 24 is in open position, as shown in Fig. 3, and deflects the heated air from passing to the windshield and permits the heated air to pass into and through the conduit 25 into the engine crankcase.

In the electric circuit diagram shown in Fig. 5, one circuit contact 14b of the heater 14 is connected by an electric current conductor 32 of which one end is grounded. The other contact 14c of the heater 14 is connected by conductor 33 which is electrically connected with one contact of a time-controlled switch, diagrammatically illustrated and designated by numeral 34, and the other contact of the time-controlled switch 34 is connected by an extension of the conductor 33 with the positive pole of a storage battery 35 of the automobile; the negative pole of the battery being grounded.

One end of the electrically driven pump is connected by conductor 36 with the conductor 33 while the pump circuit is grounded by conductor 37.

Connected with opposite ends of the conductor 33 is a by-pass conductor 33a whereby current passing through the conductor 33 may by-pass the time-controlled switch 34 when the manually operable ignition switch 38 for the automobile motor within the by-pass circuit is closed and the control switch 39 within the conductor 33 is in open position.

As above stated, the time-controlled switch 34 is diagrammatically shown and may be of any suitable type. For example, the time-controlled switch may be one of the type illustrated in Fig. 5 wherein a pointer 40 actuated by a conventional clockwork device is adapted to cooperate with a dial 41 graduated in minutes; the switch 34 being in open circuit position when the pointer 40 is normally set at zero. When the circuit through switch 34 and conductor 33 is desired to be closed for a predetermined interval of time, it is only necessary to manually turn the pointer 40 to the proper minute designation on the graduated dial 41 and then released; whereupon the circuit through the switch 34 will be automatically opened after having been closed for the interval of time designated by the dial graduation to which it had been turned.

From the circuit diagram illustrated in Fig. 5, it will be readily apparent that when the ignition switch 38 is open and the switch 39 is closed, as shown in Figs. 1 and 5, the heater 14 is automatically operable during a predetermined interval of time under the control of the switch 34 and by the energy supplied by the storage battery 35.

When the operator takes possession of the automobile to drive it, the operator obviously disconnects the heater 14 from operation by the time-controlled switch 34 by simply opening switch 39 and closing ignition switch 38 whereupon the heater 14 is supplied with current from the battery through the by-pass conductor 33a while the automobile engine is in operation.

From the above description and attached drawing it will readily be apparent that I have provided a novel time-controlled heating system for motor-driven vehicles which can be manually or automatically set into operation at selected periods of time and which will operate for a predetermined interval of time to pre-heat the interior of the automobile and engine so that when the operator is ready to drive the automobile the interior thereof will have been sufficiently heated for comfort and the engine will start easily due to its pre-heating.

I claim:

1. In a time-controlled heating system for motor vehicles, the combination with a source of electric energy of an ignition system for the vehicle driving motor, of a circuit connected with said source of energy, a self-starting gasoline-powered heater operatively and electrically connected in said circuit, and a time-controlled switch in said circuit adapted to automatically open said circuit at a selectively predetermined period of time to stop the operation of said heater.

2. In a time-controlled heating system for motor vehicles as set forth in claim 1 and including a manually operable control switch in said circuit between said time-controlled switch and said source of energy, a by-pass circuit having one terminal connected in said circuit between said manually operable switch and said source of energy and its other terminal connected to said circuit between said time-controlled switch and said heater, and a manually operable by-pass switch in said by-pass circuit.

3. In a time-controlled heating system for motor vehicles as set forth in claim 1 wherein said heater includes conduit means for by-passing heated air from said heater into the crank case of the vehicle motor to heat the piston cylinders of the motor while said heater is operatively under the control of said time-controlled switch.

4. In a time-controlled heating system for motor vehicles, the combination with a source of electric energy of an ignition system for the vehicle driving motor, of a circuit connected with said source of energy, a self-starting gasoline-powered heater operatively electrically connected in said circuit, and a time-controlled switch in said circuit adapted to automatically close said circuit whereby said heater is automatically placed into operation at a selected period of time, said switch being operative to automatically open said circuit at a selectively predetermined period of time to stop the operation of said heater.

5. In a time-controlled heating system for motor vehicles as set forth in claim 4 and including the combination with a source of electric energy of an ignition system for the vehicle driving motor, of a circuit connected with said source of energy, a self-starting gasoline-powered heater operatively electrically connected in said circuit, and a time-controlled switch in said circuit adapted to automatically close said circuit whereby said heater is automatically placed into operation at a selected period of time, said switch being operative to automatically open said circuit at a selectively predetermined period of time to stop the operation of said heater.

6. In a time-controlled heating system for motor vehicles as set forth in claim 4 wherein said heater includes conduit means for by-passing heated air from said heater into the crank case of the motor to heat the piston cylinders thereof while the heater is operatively under the control of said time-controlled switch.

CHARLES VANERKA.

REFERENCES CITED

The following references are of record in the file of this patent:

UNITED STATES PATENTS

| Number | Name | Date |
|---|---|---|
| 1,356,524 | Grange | Oct. 26, 1920 |
| 1,493,773 | Dorion | May 13, 1924 |
| 2,006,152 | Spencer | June 25, 1935 |
| 2,166,683 | Grayson | July 8, 1939 |